May 1, 1962  A. J. G. BAUDOU  3,031,723
MANUFACTURE OF FOOTWEAR ARTICLES
Filed Dec. 16, 1957  4 Sheets-Sheet 1
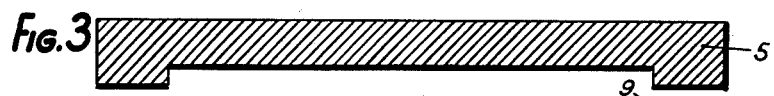
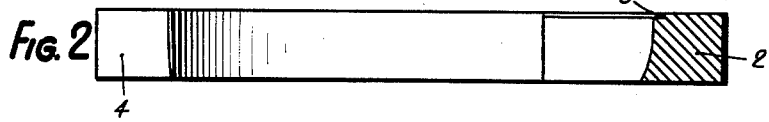
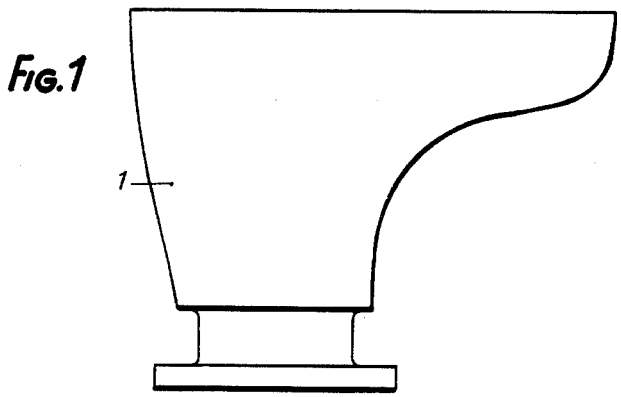
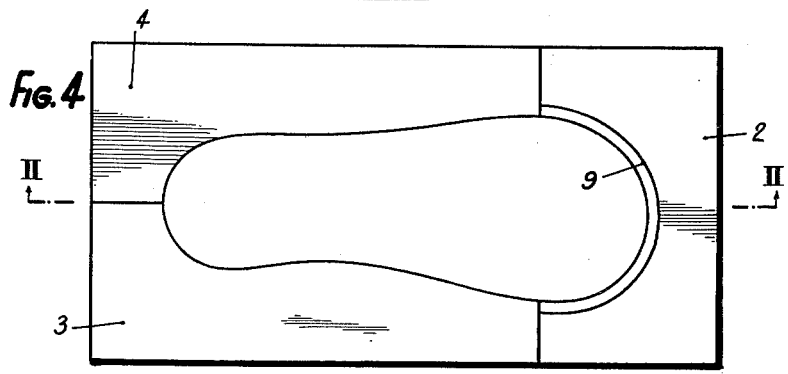
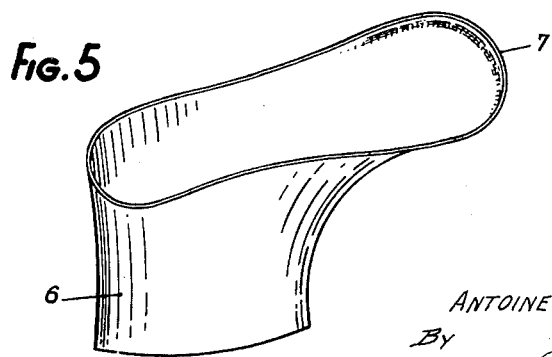
INVENTOR
ANTOINE JOSEPH GEORGES BAUDOU
BY
Irwin S. Thompson
ATTY.

May 1, 1962 A. J. G. BAUDOU 3,031,723
MANUFACTURE OF FOOTWEAR ARTICLES
Filed Dec. 16, 1957 4 Sheets-Sheet 2

INVENTOR
A.J.G. BAUDOU
BY Irwin & Thompson
ATTY.

May 1, 1962 A. J. G. BAUDOU 3,031,723
MANUFACTURE OF FOOTWEAR ARTICLES
Filed Dec. 16, 1957 4 Sheets-Sheet 3
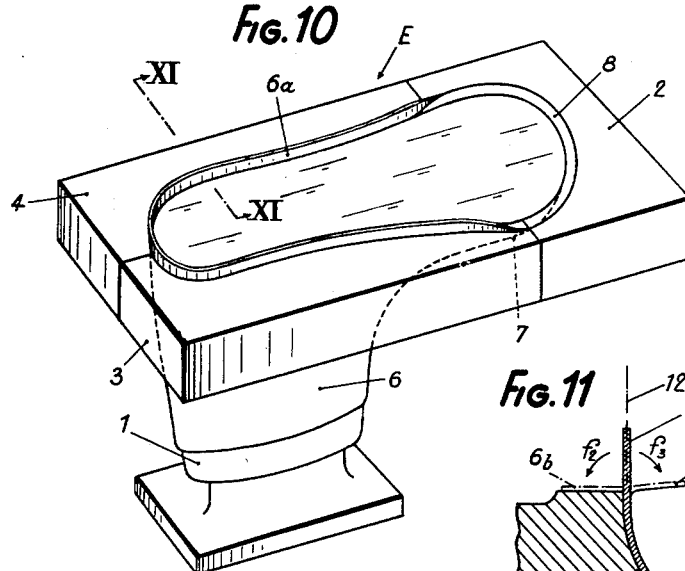
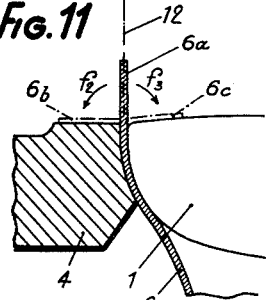
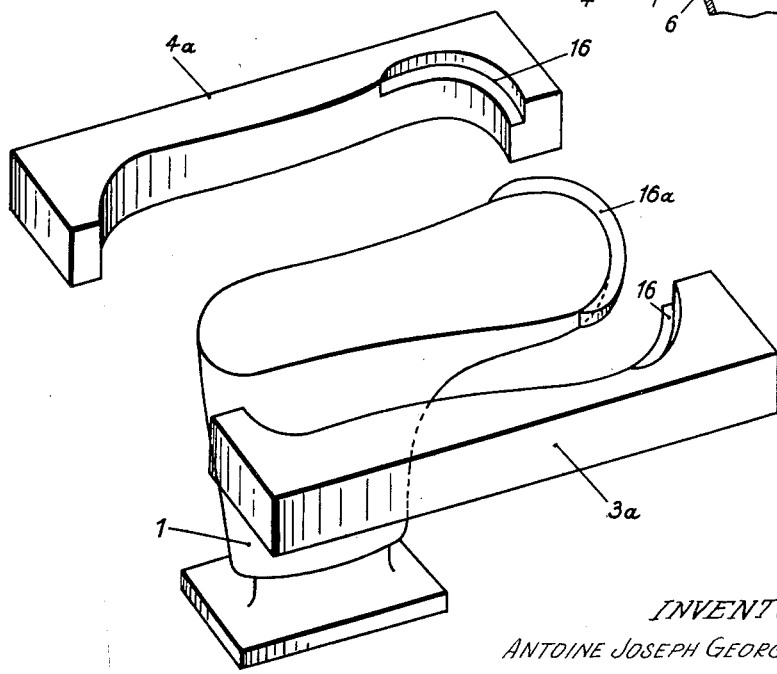
INVENTOR
ANTOINE JOSEPH GEORGES BAUDOU
By
Irvin S. Thompson
ATTY.

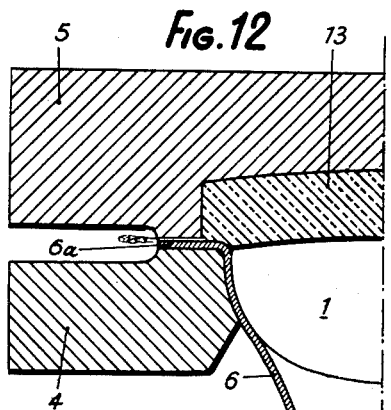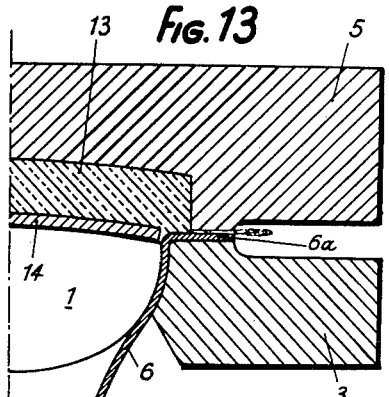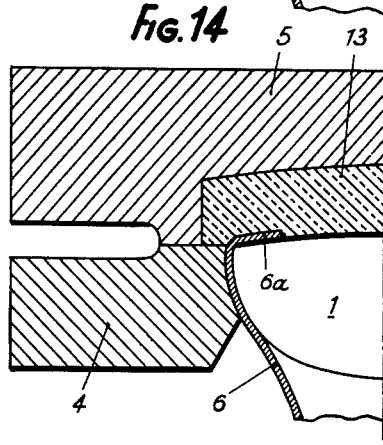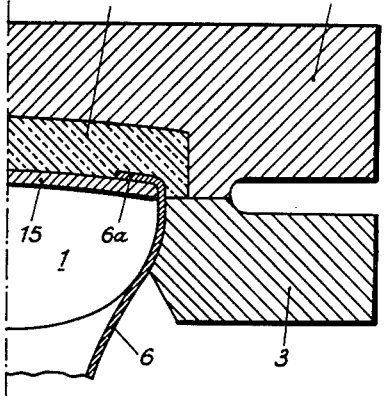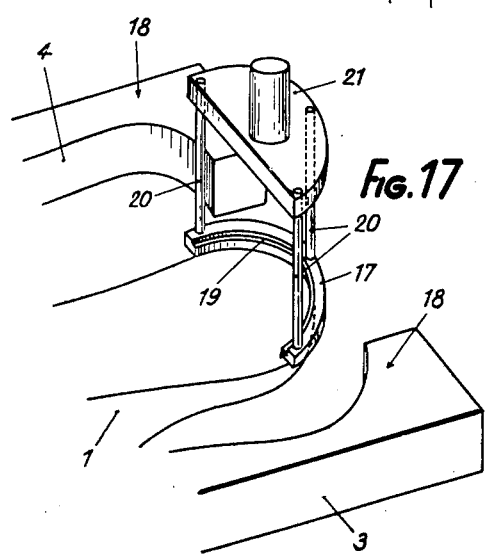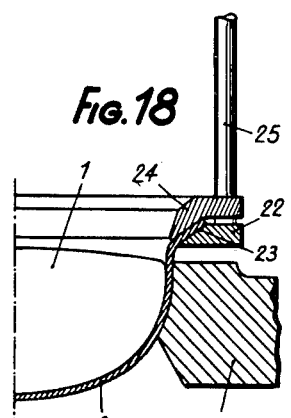

United States Patent Office 3,031,723
Patented May 1, 1962

3,031,723
MANUFACTURE OF FOOTWEAR ARTICLES
Antoine Joseph Georges Baudou, Les Eglisottes, France
Filed Dec. 16, 1957, Ser. No. 703,211
Claims priority, application France Dec. 22, 1956
9 Claims. (Cl. 18—59)

The present invention has reference to the manufacture of boots and shoes and has for its primary object to provide a new or improved method for manufacturing one-piece footwear articles of various types or shapes having a leg or upper portion (hereafter called the "upper") made of a leather, textile material or the like and a sole made of an elastomer or a plastic and obtained by usual or injection molding, said upper being either unitary or made up of pre-shaped parts stitched, glued or clipped together and having on inner sole, said method being characterized first by the fact that the shaping of the front part of the vamp of the upper, the connection of the base part of said upper to the sole, the molding of said sole, the vulcanization (when dealing with an elastomer or a mixture of elastomer and plastic) or the jellification (when dealing with plastic only) are effected in a single mold which may be either hot (for vulcanizing or cold (for jellifying) and second by the fact that the shaping operation is performed on a mold core while said core is associated with the other elements of the mold and the connecting, molding, vulcanizing or jellifying steps are simultaneously effected immediately afterwards in the same mold and on one and the same core without prior action of any ancillary stock and without any pre-shaping of the upper and also without any additional stitching for interconnecting the base of the upper and the sole.

Another object of the invention is to provide such a method wherein the lower projecting part of the base of the upper may be inwardly or outwardly bent to form a welt. Said lower projecting part may be bent before being shaped. The front part of the vamp adapted to be shaped may be bent as stated so as to enable the upper to be suitably held down as the shaping operation is performed.

A further object of the invention is to provide a device for carrying into practice the aforesaid method, said device being chiefly characterized by the fact that it is constituted by a mold made up of several elements and used jointly with one or several members permitting the shaping of the front part of the vamp of the upper to be effected with the aid of the core.

According to constructional features of this device, means are provided for holding down the front part of the vamp of the upper as it is being shaped. Such means may comprise members removably or non-removably arranged adjacent the front part of the mold core either independently or non-independently of the mold itself. The front element of the mold may or may not comprise a recess having a shape similar to the one of the front part of the vamp. One of the members which maintains the upper as the front part of the vamp is being shaped as aforesaid may be constituted by a yoke member having projections such as points or spurs. The front shell element of the mold may be provided with a series of points or spurs engaged into corresponding holes formed in the front part of the vamp so as to ensure proper hold of the latter upon the mold. One of the members that hold in position the front part of the vamp may present an element forming an abutment face for the front part of the vamp, said element being advantageously provided with a recess having a shape similar to the one of the front part of the vamp and a blocking element having projections such as points or spurs.

Advantageously the mold is made up of a pair of shells each of which is provided at its front end with a recess for receiving the complementary element of a shell the purpose of which is to form an abutment surface for the vamp-holding device and, once the mold has been closed, to complete the outer shape of the boot or shoe. The mold may be made up of three shells, namely two side shells and a front shell, the latter being adapted to serve as an abutment surface for the vamp-holding device and to complete the outer shape of the boot or shoe once the mold has been closed.

The mold may comprise a pair of shells which may be used jointly or non-jointly with a device for holding the front part of the vamp, said device including an element serving as an abutment face and a blocking element of the front part of the vamp, said device being removably or non-removably associated with the mold.

Alternatively the mold may comprise a single shell used jointly or non-jointly with a device for holding the front part of the boot or shoe vamp, said device including an element serving as an abutment surface and an element for blocking the front part of the vamp or alternatively only one blocking element for the front part of the vamp, the front part of the shell then serving as an abutment surface.

In a constructional modification, the mold may comprise more than three shells used jointly or non-jointly with the device for holding the front part of the vamp, said device including an element serving as an abutment surface and an element for blocking the front part of the vamp or alternatively only one blocking element for the front part of the vamp in which case the front shell itself serves as an abutment surface.

A still further object of the invention is to provide a device as aforesaid arranged so as to bend either outwardly or inwardly or both outwardly and inwardly the base portion of the upper as it is being shaped.

Other objects and advantages of the method and device according to the invention will appear from the continuation of this description which is given with reference to the accompanying diagrammatic drawings forming a part of the present disclosure and wherein are shown by way of non-limitative examples constructional embodiments of the invention.

FIGURE 1 is an elevational view of the core used for carrying into practice the method according to the invention.

FIGURE 2 is a sectional view of the mold along the line II—II of FIG. 4.

FIGURE 3 is a sectional view of the sole block.

FIGURE 4 is a top plan view of the mold.

FIGURE 5 is a perspective view showing the upper of the shoe blank and its vamp.

FIGURE 7 is a view similar to FIG. 6 showing the front part of the vamp after the shaping operation.

FIGURE 9b is a sectional view along the line IXb—IXb of FIG. 9a.

FIGURE 10 is a perspective view showing the mold elements as they are set into position after the shaping operation of the front part of the vamp and prior to the molding operation.

FIGURE 11 is a sectional view drawn to a larger scale along the line XI—XI of FIG. 10.

FIGURES 12 to 15 are views in half section showing, after the molding step, several manners of positioning the lower edge of the vamp.

FIGURE 16 is a perspective view of a constructional modification of the mold elements.

FIGURE 17 is a perspective view of a constructional modification of the member that holds in position the front part of the vamp in which said member is removably disposed in the neighborhood of the front part of the mold.

FIGURE 18 is a view illustrating a further constructional modification.

Figure 6:
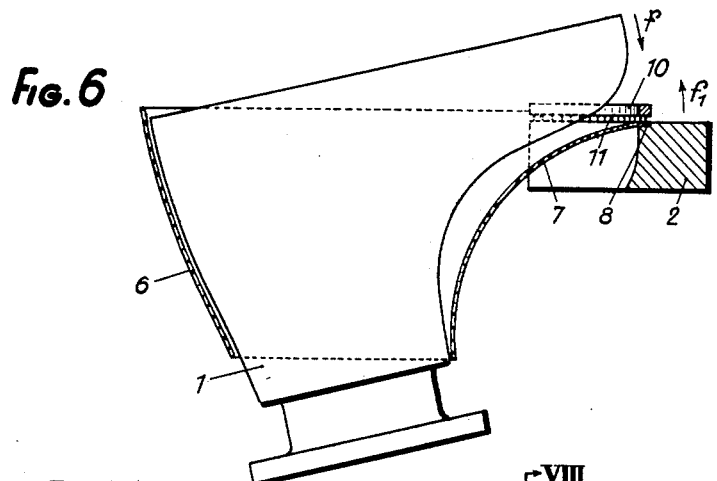
FIGURE 6 is a sectional view showing the relative positions of the core and the front element of the mold prior to shaping of the front part of the vamp.

Reference being first had to FIGS. 1 to 4, it will be seen that the mold comprised in the device for carrying into practice the method according to the invention includes a core 1 which may or may not comprise an articulated heel member, said core being made up of three shells, namely a front shell 2 and a pair of side shells 3 and 4 (the number of shells being eventually larger or smaller than three) and a sole block 5.

The upper whose vamp has its front part intended to be shaped by the method according to the invention is constituted as shown in FIG. 5. The upper 6 which may be made in known fashion of one or several parts stitched, glued or clipped together and which consists for example of leather, preliminarily embossed or stamped leather, textile material or the like has no inner sole.

Figures 7, 9B:
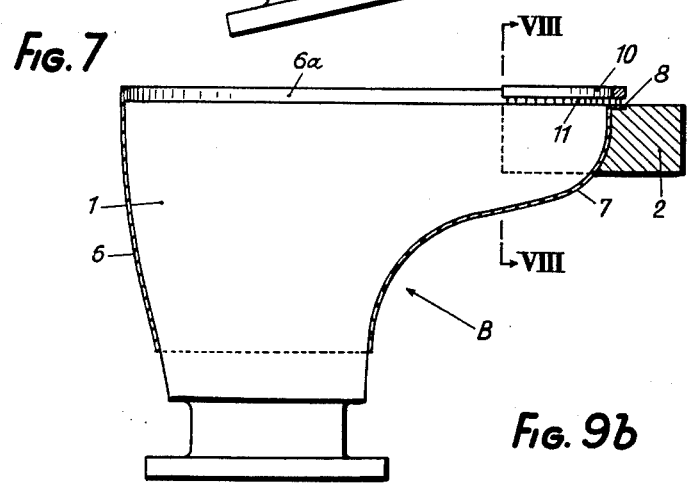
Figures 8, 9A:
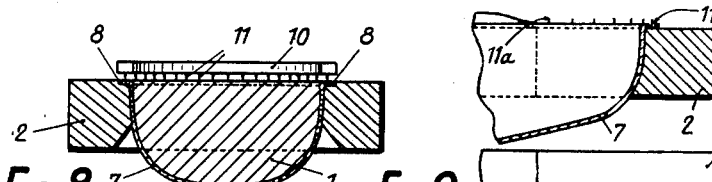
FIGURE 8 is a sectional view along the line VIII—VIII of FIG. 7.
FIGURE 9a is a plan view showing an alternative method for properly holding or maintaining the front part of the vamp upon the mold.
Figure 9:
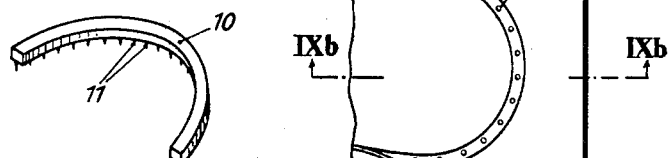
FIGURE 9 is a perspective view showing the member that provides proper hold of the front part of the vamp upon the mold.

The front shell 2 of the mold has a recess 9 having a shape similar to the one of the front part of the vamp 7 and adapted to receive said front part after it has been preliminarily bent down as illustrated at 8 in FIGS. 6, 7 and 8. After having been frictionally engaged in the recess 9, the bent portion 8 is firmly held in position by a yoke member 10 provided for example with points or spurs 11.

In order to shape to shape the front part of the vamp 7, the work should be conducted as follows: The upper 6 of the shoe blank is first engaged upon the core 1 or alternatively said core is engaged into the upper 6 (as shown by FIG. 6) and, after the bent portion 8 has been firmly engaged into the recess 9, the yoke member 10 is positioned, its points or spurs 11 firmly maintaining the bent portion 8 in the recess 9. This is an essential condition for properly shaping the front part of the vamp 7.

In order to hold the front part of the vamp upon the mold, a series of points or spurs 11a formed on the surface of the front shell 2 of the mold and engageable into corresponding holes 11b in the front part of the vamp 7 (see FIGS. 9a and 9b) may be also provided.

Following this, the core 1 is moved in the direction indicated by the arrow $f$ (FIG. 6) where the front shell 2 is stationary or alternatively said shell is moved in the direction indicated by the arrow $f^1$ (FIG. 6) if conversely the core is stationary. However the core 1 and the front shell 2 could be also moved either simultaneously or alternately.

This being done, a perfect shaping of the front part of the vamp 7 is obtained as shown by FIG. 7, the base of the upper 6 proudly projecting as shown as 6a with respect to the sole base of the core 1. A block B made up of the core 1 of the front shell 2 and the leg or upper portion 6 is thus obtained, the front part of the vamp 7 having then assumed its final shape.

The block B is then shifted toward the preliminarily opened side shells 3, 4, which are then so closed as to obtain an assembly E, as illustrated in FIG. 10. The possibility also exists, before closing the side shells 3, 4, and while they are opened, to shift them toward the block B or alternatively to shift the latter simultaneously or alternately toward the opened side shells or to move said shells toward the block B.

Another possibility directed to close the side shells 3, 4 upon the block B if the latter is in such a position, after the previous vamp-shaping step, that it is not necessary to bring the two side shells 3, 4 together for closing them upon the block B.

Alternatively the side shells 3 and 4 may be closed while the block B is being constituted.

As will be seen from FIGS. 10 and 11 and as previously set forth, the base portion 6a of the upper 6 proudly projects with respect to the sole base of the core 1. It is consequently possible, prior to the molding or while the molding is being done, either to bend down this projecting portion outwardly in the direction indicated by the arrow $f_2$ or to bend it inwardly in the direction indicated by the arrow $f_3$ (FIG. 11). Said projecting portion may have been previously slotted along the line 12 whereupon each of the resulting portions 6b and 6c may be respectively folded outwardly and inwardly as illustrated by the chain lines in FIG. 11.

Where a conventional molding operation with the use of rubber is made, a non-vulcanized sole 13 (FIG. 12) is applied against the sole base of the core 1 inside the recess provided by the projecting portion 6a of the base of the upper 6, whereafter the sole unit 5 may be brought closer to the block B or alternatively the block B may be brought closer to the sole block 5 or both parts may be brought together simultaneously or alternately.

The pressure exerted by the sole unit 5 crushes the rubber part which rubs the inner face of the projecting end 6a throughout its periphery and said part is finally bent down against the face of the shells (FIG. 12) where it has not yet been bent down, and the rubber part then sticks to the inner face of the upper 6. Prior to molding there may be interposed between the sole 13 and the sole base of the core 1 an inner sole 14 (FIG. 13).

The same result can be obtained by injecting rubber and/or a plastic material after closing the mold.

Alternatively the possibility is offered, by the use of a suitable device, to bend down prior to molding the projecting part 6a of the upper 6 either direct upon the sole base of the core 1 (FIG. 14) or upon an inner sole 15 which may be identical with the sole 14 that has been preliminarily applied against the sole base (FIG. 15).

Where the upper 6 is made of leather, the method which includes outwardly bending down the projecting part 6a of the upper 6 has a major advantage because it permits, by leaving the grain side of the leather externally of the footwear article, the rubber and/or plastic part to be stuck against the flesh side of the leather and thereby to perform perfect adhesion.

This permits preliminary scraping or scratching of the flesh side of the leather, as is indispensable when the leather part is bent down against the sole base of the core 1 and when the flesh side of said leather part is situated on the outer side of the leg or upper portion, to be avoided.

This method also permits a leather welt to be obtained by the use of the leather that constitutes the vamp.

According to the constructional modification which is shown in FIG. 16, the side shells 3a and 4a have the same form as the normal shells of a two shelled mold but each of them is provided at its front end with a recess 16 adapted to receive a complementary shell 16a the purpose of which is, once the mold has been closed, to complete the outer shape of the boot or shoe being made.

The complementary shell 16a may be used in the same fashion as the front shell 2.

In the showing of FIG. 17 is illustrated a device for holding and blocking the bent part 8 of the vamp 7. This device is made up of a yoke member 17 which is clearly offset in the direction of the sole block and with respect to the face 18 of the two side shells 3 and 4 when the latter are closed. Said yoke member 17 may or may not comprise a recess 19 similar to the recess 9 formed in the front shell 2 and intended to receive the bent portion 8.

The yoke member 17 is provided with three guiding stems or rods 20 along which can be moved a block member 21 or a yoke member having the same shape as the yoke member 17 fitted with spurs similar to those carried by the yoke member 10 and adapted firmly to hold, when the yoke member 21 is in its lowered position, the bent part 8 into the recess 19.

In the showing of FIG. 18 the holding device is constituted by an element 22 having a slanting edge 23 for receiving the bent part 8 which is maintained by an element 24 capable of being shifted along guides 25.

The device shown by way of example in FIGS. 17 and 18 permits the front part of the vamp to be shaped without any need previously to resort to the use of a front shell. This device may be disengaged prior to molding or else it may be housed in recesses formed either at the front end of each of the two side shells 3, 4 or in a recess formed at the front end of the sole block or simultaneously in these three elements.

It will be understood that the method of manufacturing footwear articles and the device for carrying this method into industrial practice as described and shown in the accompanying drawings permit the easy manufacture of boots and shoes having a sole made of rubber or more generally of an elastomer and/or a plastic, the shaping of the front part of the vamp being effected under perfect conditions in one and the same curing mold no matter whether a vulcanizing or a jellifying step is carried out, without any need to use anciliary stock and without the upper of the boot or shoe blank having to be subjected to any preshaping operation, also without any need to effect an additional stitching for interconnecting the base part of the upper and the sole of the boot or shoe.

Obviously modifications may be introduced in the constructional details of the device without departing from the ambit of the invention. Thus for example the bent down part 8 might be abutted upon the face of the front shell 2 itself, the latter having no recess.

The accompanying drawings pre-suppose the hypothesis where the mold is made up of three shells (as shown in FIG. 4) including at least two symmetrical side shells or two symmetrical side shells (as shown in FIG. 17). However it is feasible to conceive a mold made up of a pair of nonsymmetrical shells, for example a shell wrapping the two ends of the shoe blank and completed by a side shell the position of which would be facing the inside of the wearer's foot. Such a shell would extend from the front end of the heel portion and up to that portion corresponding to the metatarsus. The front end of the enveloping shell might serve as an abutment surface for the device clamping the front part of the upper and might thus play the same function as the shell 2 (FIG. 6) or as the shell 16a (FIG. 16). It might be also used in cooperation with the core and a clamping or tightening device such as the one shown in FIGS. 17 and 18.

Another conceivable modification is one where the mold would only comprise one shell enveloping the entire shoe blank periphery, the front part of said shell forming an abutment surface for the clamping or tightening device for the front part of the upper of the shoe blank and thus playing the same function as the shell 2 (FIG. 6) or the shell 16a (FIG. 16) or alternatively being used in cooperation with the core 1 and a clamping device such as the one shown in FIGS. 17 and 18.

These and other similar modifications are included in the scope of the appended claims.

What is claimed is:

1. A method of manufacturing one-piece footwear articles comprising the steps of inserting a prefabricated but nonshaped upper having a vamp within a vulcanization mold having outer shells, said mold having a portion to define a predetermined configuration for shaping said vamp, arranging the front portion of said vamp within a recess of one of said outer shells, holding the front portion of said vamp within said recess with holding means, inserting a shaping core having a configuration the same as said predetermined configuration of said mold within said mold, pressing said shaping core firmly into said mold so that the vamp is stretched and shaped in accordance with the configuration of the mold and shaping core, introducing a substance onto the mold and core to form a sole for said upper, pressing a sole block onto and toward said mold, and molding and vulcanizing said substance to said upper to produce a sole member thereon in permanent position therewith.

2. A method according to claim 1 in which said substance to form said sole is rubber.

3. A method according to claim 1 in which said substance to form said sole is plastic.

4. A method according to claim 1 in which said substance to form said sole is a mixture of elastomer and plastic.

5. A method according to claim 1 in which said substance to form said sole is elastomer.

6. A method of manufacturing one-piece footwear articles comprising the steps of inserting a prefabricated but non-shaped upper having a vamp within a vulcanization mold having outer shells, arranging said upper within said mold in such a position that the lower end of said upper protrudes above said shells, disposing the front portion of said vamp within a recess of one of said outer shells, holding the front portion of said vamp within said recess with holding means, shaping the front portion of said vamp by inserting a shaping core within said mold to stretch the front portion of said vamp to the configuration of said shaping core, bending down the lower end of said upper that protrudes above said shells and said core to form a welt, and thereafter simultaneously binding and molding a sole to said upper in said mold.

7. A method according to claim 6 in which the lower end of said upper that protrudes above said shells is bent inwardly.

8. A method according to claim 6 in which the lower end of said upper that protrudes above said shells is bent outwardly.

9. A method according to claim 6 in which there comprises the further step of placing an inner sole over said shaping core prior to binding and molding a sole to said upper.

References Cited in the file of this patent

UNITED STATES PATENTS

| | | |
|---|---|---|
| 947,895 | Engel | Feb. 1, 1910 |
| 1,019,310 | Dunn | Mar. 5, 1912 |
| 1,385,647 | Strauss | July 26, 1921 |
| 1,995,429 | Laura | Mar. 26, 1935 |
| 2,029,195 | Riddock | Jan. 28, 1936 |
| 2,221,742 | Hoza | Nov. 12, 1940 |
| 2,786,237 | Keen et al. | Mar. 26, 1957 |
| 2,789,295 | Rollman et al. | Apr. 23, 1957 |
| 2,795,822 | Long | June 18, 1957 |